United States Patent
Nakashima

(10) Patent No.: US 11,762,613 B2
(45) Date of Patent: Sep. 19, 2023

(54) SYSTEM AND METHOD OF CONTROLLING SYSTEM

(71) Applicant: CANON KABUSHIKI KAISHA, Tokyo (JP)

(72) Inventor: Kazuya Nakashima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/696,698

(22) Filed: Mar. 16, 2022

(65) Prior Publication Data

US 2022/0308813 A1 Sep. 29, 2022

(30) Foreign Application Priority Data

Mar. 24, 2021 (JP) .................................. 2021-049538
Oct. 19, 2021 (JP) .................................. 2021-171119

(51) Int. Cl.
*G06F 3/12* (2006.01)

(52) U.S. Cl.
CPC .......... *G06F 3/1285* (2013.01); *G06F 3/1207* (2013.01); *G06F 3/1267* (2013.01); *G06F 3/1268* (2013.01); *G06F 3/1274* (2013.01); *G06F 3/1238* (2013.01)

(58) Field of Classification Search
None
See application file for complete search history.

(56) References Cited

U.S. PATENT DOCUMENTS

| | | | |
|---|---|---|---|
| 9,690,522 B2 | 6/2017 | Yasukawa | |
| 10,404,889 B2 | 9/2019 | Miyamoto et al. | |
| 11,119,710 B2 | 9/2021 | Inoue | |
| 11,182,118 B2 | 11/2021 | Sato | |
| 2015/0092233 A1 | 4/2015 | Park et al. | |
| 2017/0230536 A1* | 8/2017 | Haapanen | G06F 3/1292 |
| 2018/0253268 A1 | 9/2018 | Tonegawa | |
| 2018/0341759 A1 | 11/2018 | Sato | |
| 2020/0409632 A1* | 12/2020 | Martin | G06F 3/1285 |

(Continued)

FOREIGN PATENT DOCUMENTS

| | | |
|---|---|---|
| EP | 3376748 B1 | 2/2020 |
| JP | 2018206278 A | 12/2018 |

(Continued)

OTHER PUBLICATIONS

Examination Report issued in Indian Application No. 202244015371 dated Oct. 18, 2022. English translation provided.

(Continued)

*Primary Examiner* — Frantz Bataille
(74) *Attorney, Agent, or Firm* — ROSSI, KIMMS & McDOWELL LLP

(57) ABSTRACT

The system according to the present disclosure includes a cloud print service (CPS) connected to a client terminal via a network, and a CPS connected to an image forming apparatus through a network. The CPS receives a job executed by the image forming apparatus from the client terminal, and transmits the job to the CPS. The CPS receives a job transmitted from the CPS, issues a job code for the job, and transmits the job code to the CPS. The CPS receives the job code issued by the CPS, and notifies the client terminal of the job code.

6 Claims, 9 Drawing Sheets

(56) References Cited

U.S. PATENT DOCUMENTS

2021/0132886 A1* 5/2021 Inoue .................. G06F 3/1207
2022/0317952 A1 10/2022 Takagi

FOREIGN PATENT DOCUMENTS

| JP | 2020185730 A | 11/2020 |
| JP | 2020187700 A | 11/2020 |

OTHER PUBLICATIONS

Extended European search report in European Appln. No. 22162717.7 dated Sep. 21, 2022.
Office Action issued in U.S. Appl. No. 17/705,723 dated Jan. 19, 2023.
Notice of Allowance issued in U.S. Appl. No. 17/705,723 dated May 3, 2023.

* cited by examiner

FIG. 6
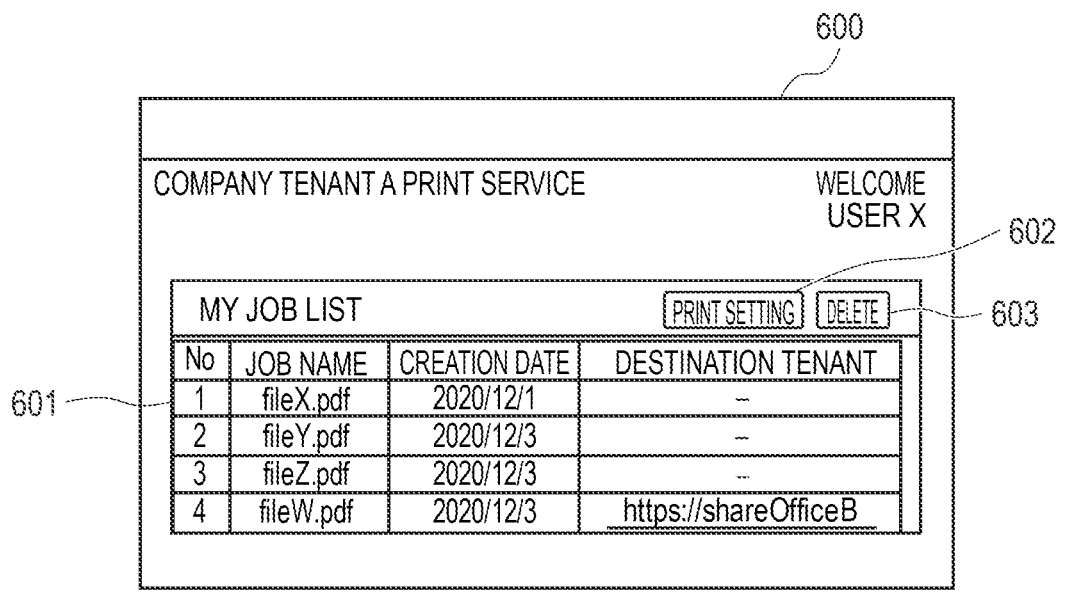
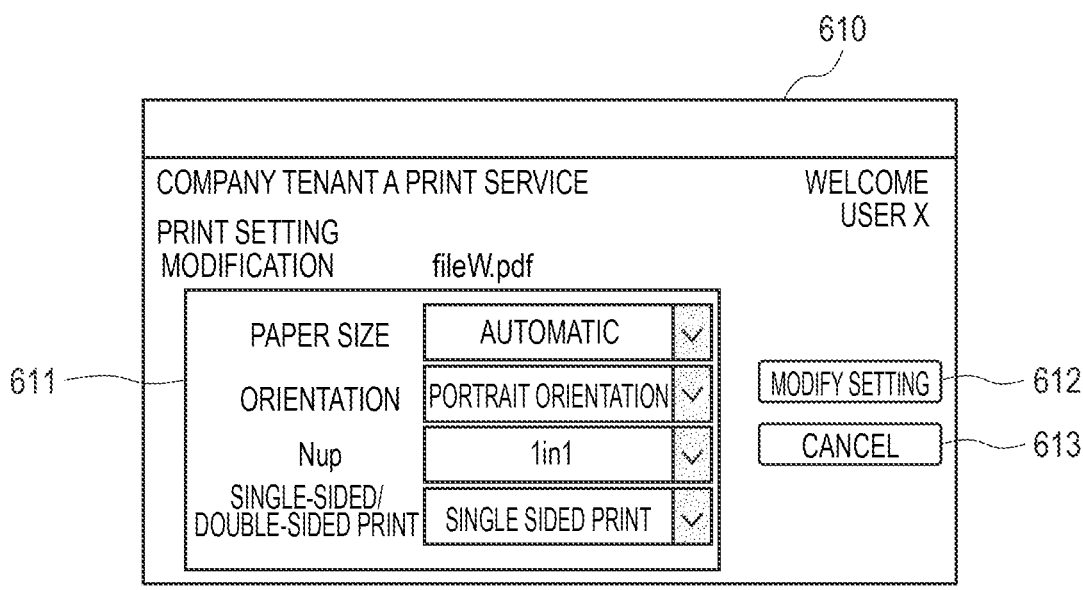

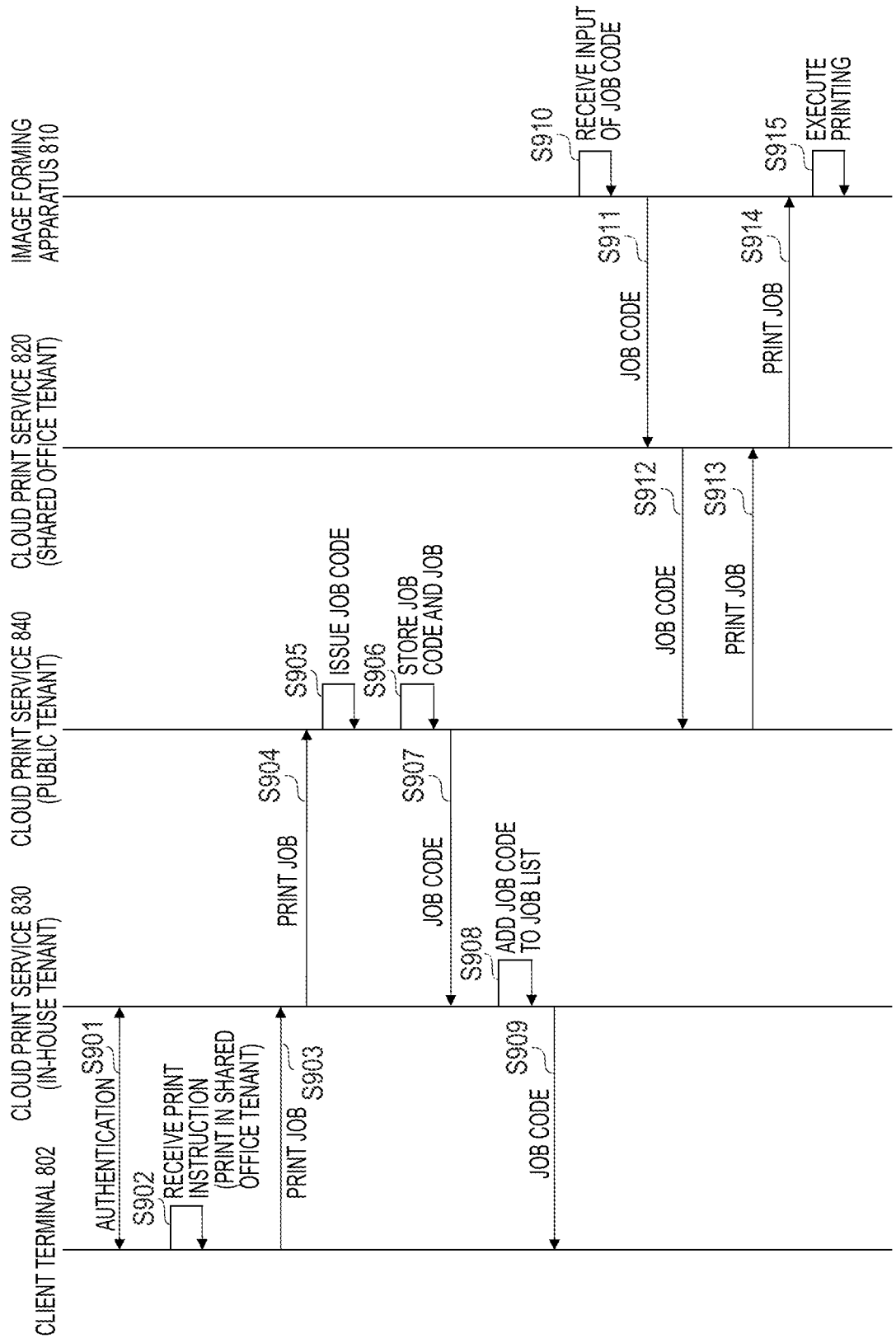

SYSTEM AND METHOD OF CONTROLLING SYSTEM

BACKGROUND OF THE INVENTION

Field of the Invention

The present invention relates to a system and a method of controlling the system.

Description of the Related Art

In recent years, a cloud print service (CPS), in which a print job is submitted via a network service called the cloud and the print job is sent to an image forming apparatus, has begun to spread. In the printing system using the CPS, after the image forming apparatus is registered with a tenant corresponding to the CPS, a user belonging to the tenant is allowed to use the image forming apparatus.

In the present disclosure, a tenant corresponds to a service system deployed by a user on a cloud and has a storage area whose access is restricted to the user. For example, in a company A tenant of a cloud print service used in a company A, an employee working for the company A is registered as a user, and an image forming apparatus under the management of the company A is registered and used. Thus, the user of the company A allows the image forming apparatus under the management of the company A to perform printing by giving an instruction related to printing from a client terminal in the company to the image forming apparatus. For example, Japanese Patent Application Laid-Open No. 2020-187700 discloses an example of a technology for realizing CPS.

As an example of a function provided by the CPS, there is a function of issuing a job code for a submitted job and inputting the job code to an image forming apparatus to print the job. For example, when a user inputs a job to the CPS, the CPS issues a unique job code indicating the job and transmits a mail address of the input user information. The user confirms a mail using a smartphone or the like and inputs a job code to an image forming apparatus for printing the job.

As another example of the functions provided by the CPS, there are functions related to the presentation of a list of jobs input to the CPS, and functions related to the reception of various instructions (for example, an instruction to delete a job.) for jobs designated through the list. By providing such functions, for example, even after a job is submitted to the CPS, the user can confirm information about the job (for example, job contents, etc.), change various settings related to the execution of the job, and the like.

With the diversification of working styles, there is a demand for the introduction of a system for enabling the printing of documents stored in internal client terminals by using an image forming apparatus installed in an external space such as a so-called shared office. In response to such a request, for example, a mechanism for enabling guest printing through an in-house tenant without having a shared office account has been considered.

When so-called guest printing is performed in a state that the user does not have an account of a shared office tenant through an in-house tenant, a job code is transmitted to an in-house tenant user who is a request source of printing. On the other hand, the shared office which issues the job code does not have a transmission destination (for example, email address information) of the job code for notifying the job code to the user. Therefore, it is a common method for an in-house tenant to transmit mail address information of the user used as a transmission destination of the job code to the shared office tenant at the time of the job transmission. In this case, the shared office tenant issues the job code of the job in response to the job transmitted from the in-house tenant, and transmits the job code to the mail address sent from the in-house tenant to notify the user of the job code.

However, it is not desirable to transmit user information managed by a company tenant to a shared office from the viewpoint of vulnerability. In particular, if the company tenant and the shared office tenant are realized by different CPSs, it is difficult for the CPS of the company tenant to guarantee the vulnerability countermeasure to the CPS of the shared office tenant which is outside the area from the CPS of the company tenant.

SUMMARY OF THE INVENTION

The system according to the present disclosure comprises a first cloud print service connected to a client terminal via a network and a second cloud print service connected to an image forming apparatus via a network, the first cloud print service comprising: first job receiving means for receiving, from the client terminal, a job executed by the image forming apparatus; job transmitting means for transmitting the received job to the second cloud print service; job code receiving means for receiving a job code issued by the second cloud print service; and notifying means for notifying the client terminal of the received job code, and the second cloud print service comprising: second job receiving means for receiving a job transmitted from the first cloud print service; issuing means for issuing a job code for the received job; and job code transmitting means for transmitting the issued job code to the first cloud print service.

Further features of the present invention will become apparent from the following description of exemplary embodiments with reference to the attached drawings.

BRIEF DESCRIPTION OF THE DRAWINGS

FIG. 6 shows an example of a screen for modifying a job.

FIG. 9 shows a sequence diagram depicting another example of processes for printing in association with the CPS.

DESCRIPTION OF THE EMBODIMENTS

The best embodiments of the present disclosure will now be described in detail with reference to the accompanying drawings.

In the present specification and the drawings, components having substantially the same functional configuration are denoted by the same reference symbols, and redundant description thereof is omitted.

<System Configurations>

An example of the system configurations of the system according to the present embodiment will be described with reference to FIG. 1.

Figure 1:
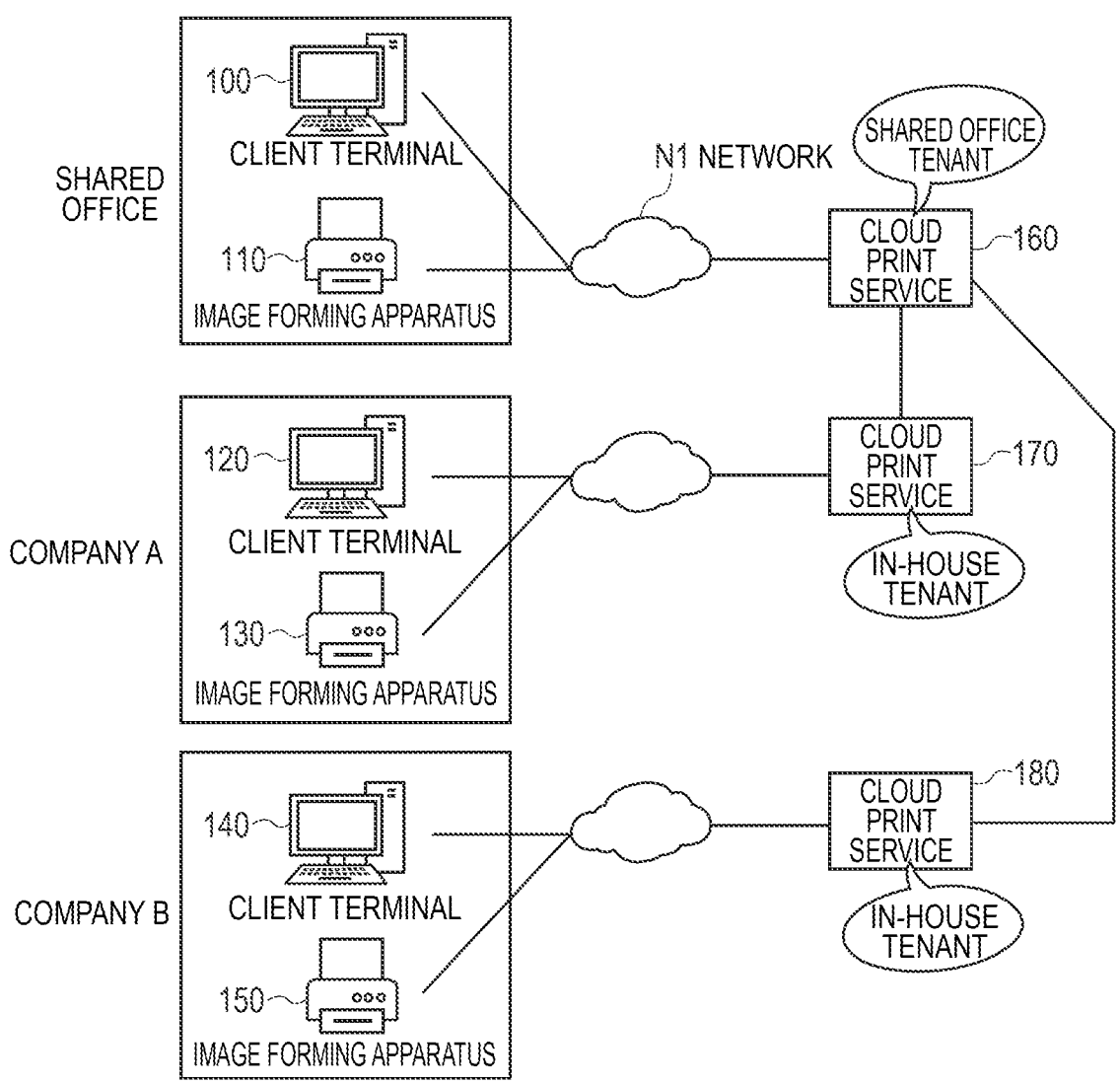
FIG. 1 shows an example of system configurations according to the present disclosure.

The system shown in FIG. 1 includes Cloud Print Services (CPSs) 160, 170, and 180.

The CPS 170 schematically represents a cloud print service that can be used by a user (for example, employees, etc.) under control of a company A. A client terminal 120 and an image forming apparatus 130 schematically represent a client terminal and an image forming apparatus under control of the company A. In other words, each of the CPS 170, the client terminal 120, and the image forming apparatus 130 is associated with a tenant of the Company A.

Similarly, each of the CPS 180, a client terminal 140, and an image forming apparatus 150 is associated with a tenant of a company B that is different from the tenant of the company A.

The CPS 160 also schematically represents a cloud print service under control of a shared office. A client terminal 100 and an image forming apparatus 110 schematically represents a client terminal and an image forming apparatus under control of the shared office. In other words, each of the CPS 160, the client terminal 100, and the image forming apparatus 110 is associated with a tenant of a shared office.

In the following description, the tenants of the company A and the company B are collectively referred to as "in-house tenants" for convenience. The shared office tenants are also referred to as "shared office tenants." A shared office tenant is an example of public tenants, and among the public tenants, one that can be connected by limited subjects (for example, users, CPS, etc.) under predetermined conditions.

Specifically, the public tenant corresponds to a tenant for managing an image forming apparatus installed in a so-called public space such as a convenience store, a library and a station. A CPS for utilizing an image forming apparatus associated with a public tenant is also available, and the CPS is also referred to as a "public print service" for convenience. On the other hand, in the shared office, for example, a connectable user or CPS may be restricted based on the management by the administrator of the shared office. That is, the CPS associated with the shared office can limit the available users compared to the public print service described above.

There may be multiple client terminals 120, the client terminals 140, the client terminals 100, the image forming apparatuses 130, the image forming apparatuses 150, and the image forming apparatuses 110.

For example, the CPS 170 may receive a print job from the client terminal 120 and transmit the print job to the image forming apparatus 130. In this case, when receiving a print job from the CPS 170, the image forming apparatus 130 executes printing based on the print job. As another example, the CPS 170 may transmit a print job received from the client terminal 120 to the CPS 160.

The foregoing is substantially same among the CPS 180, the client terminal 140, the image forming apparatus 150, and the CPS 160.

The CPS 160 may receive a print job from the client terminal 100 and transmit the print job to the image forming apparatus 110. The CPS 160 may also receive a print job from the CPS 170 or CPS 180 and transmit the print job to the image forming apparatus 110. When receiving a print job from the CPS 160, the image forming apparatus 110 executes printing based on the print job.

The components described above are connected to each other so as to be able to communicate with each other via a predetermined network N1. It should be noted that a type of the network N1 is not particularly limited as long as data can be transmitted and received between the above-mentioned components. As a specific example, any one of the Internet, LAN, WAN, telephone line, leased digital line, ATM, etc., or a combination thereof may be applied as the network N1.

In the present embodiment, the CPSs 170 and 180 are implemented as separate CPSs so that each works as an in-house tenant and the CPS 160 works as a shared office tenant. It should be noted that the configuration shown in FIG. 1 is just an example, and the system configuration of the printing system according to the present embodiment is not necessarily limited to the configuration of FIG. 1. As a specific example, at least one of CPS 170 and 180 may also serve as CPS 160. As another example, CPS 160 may also serve as at least one of the roles of CPS 170 and 180. In this way, the functions of two or more cloud print services out of a series of cloud print services shown in FIG. 1 may be realized by one cloud print service.

<Hardware Configurations>

Figure 2:
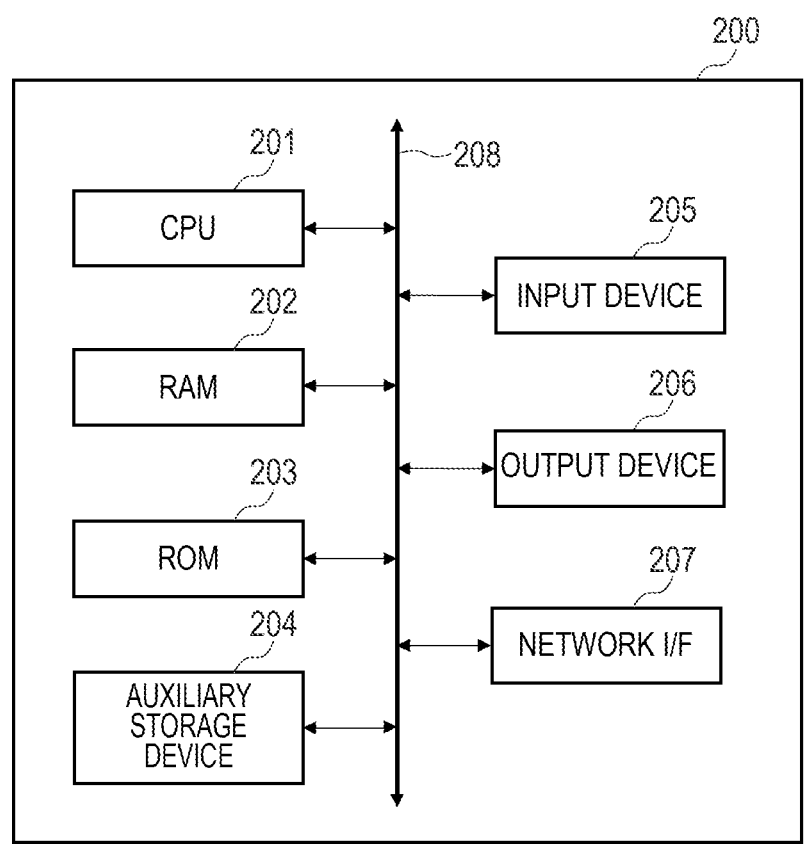
FIG. 2 shows an example of hardware configurations of the information processing device according to the present disclosure.

An example of hardware configurations of an information processing apparatus 200 constituting the system according to the embodiment of the present disclosure will be described with reference to FIG. 2. The client terminals 100, 120, and 140 correspond to the information processing apparatus 200 according to the present embodiment. Further, a server computer installed on the data center for constructing the CPSs 160, 170, and 180 also corresponds to the information processing apparatus 200. The information processing apparatus 200 includes a CPU (Central Processing Unit) 201, a RAM (Random Access Memory) 203, and a ROM (Read Only Memory) 202. The information processing apparatus 200 includes an auxiliary storage device 204 and a network I/F 207. The information processing apparatus 200 may include at least one of an input device 205 and an output device 206. Each of the CPU 201, the RAM 202, the ROM 203, the auxiliary storage device 204, the input device 205, the output device 206, and the network I/F 207 is connected to each other via a bus 208.

The CPU 201 is a central processing unit that controls various operations of the information processing apparatus 200. For example, the CPU 201 may control the entire operation of the information processing apparatus 200.

The RAM 202 is a main storage memory working with the CPU 201 and is used as a work area or a temporary storage area for developing various programs.

The ROM 203 stores a program (for example, BIOS) and the like for the CPU 201 to control the operation of the information processing apparatus 200.

The auxiliary storage device 204 stores programs such as an OS (Operating System) as a basic Software, various applications, and various data. The auxiliary storage device 204 may be implemented by using, for example, a hard disk drive (HDD) or a nonvolatile memory such as a solid state drive (SSD).

The network I/F 207 is connected to a predetermined network (for example, LAN, Internet, etc.) and is an interface for communicating with an external device via the network.

The input device 205 is a device for receiving instructions from a user. The input device 205 may be realized by, for example, a pointing device such as a mouse, an operating device such as a keyboard, a touch panel, or the like.

The output device 206 is a device for presenting various types of information to the user. The output device 206 may be implemented by a display device which presents information to a user by displaying various types of information, screens, and the like.

The configuration described above is just an example, and the hardware configuration of the information processing apparatus 200 is not necessarily limited to the example. As a specific example, some of components (for example, at least one of the input device 205 and the output device 206) in the series of constituent elements of the information processing apparatus 200 described above may be external to the information processing apparatus 200.

Figure 5:
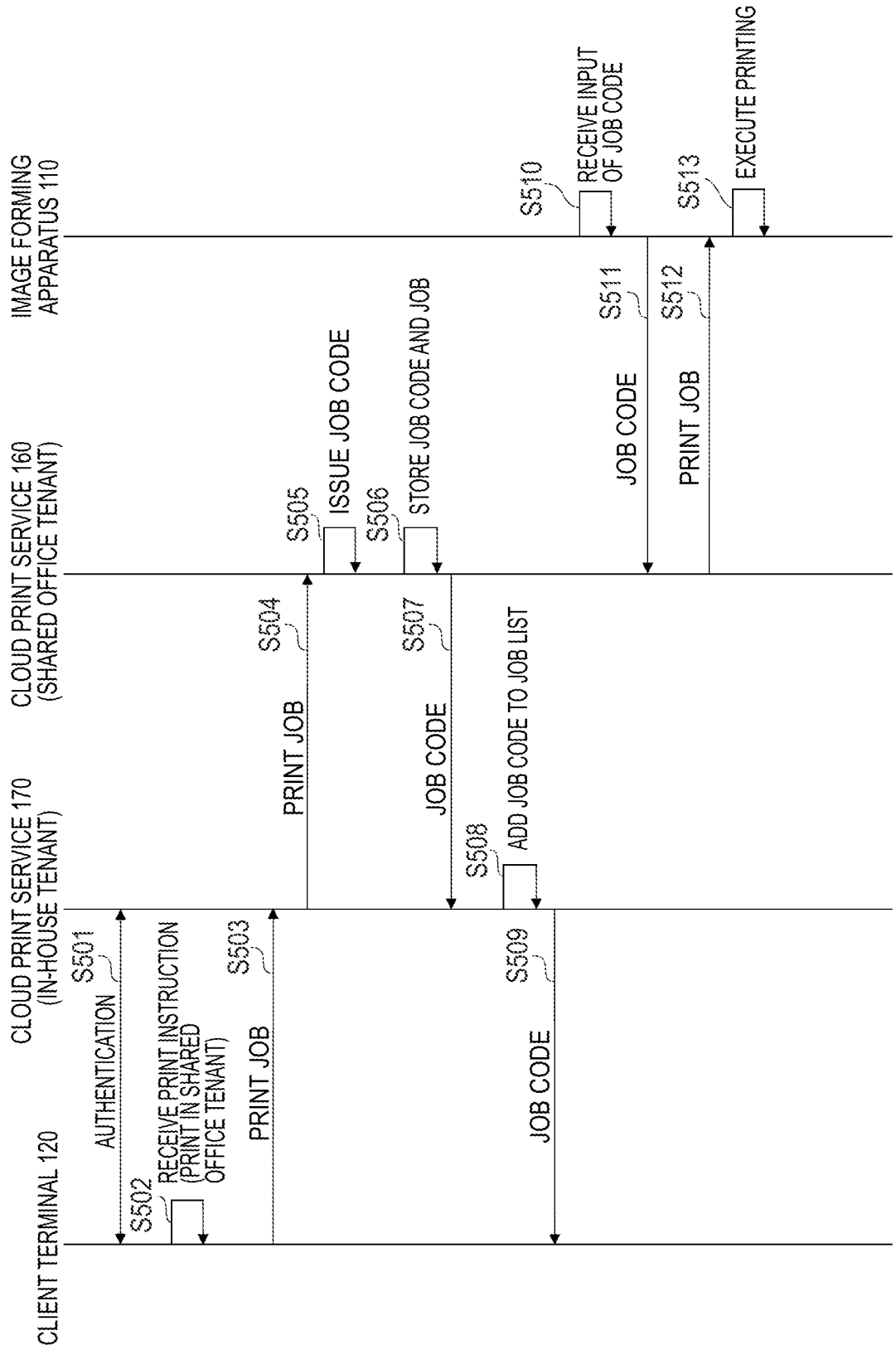
FIG. 5 shows a sequence diagram depicting an example of processes for printing in association with the CPS.
Figure 7:
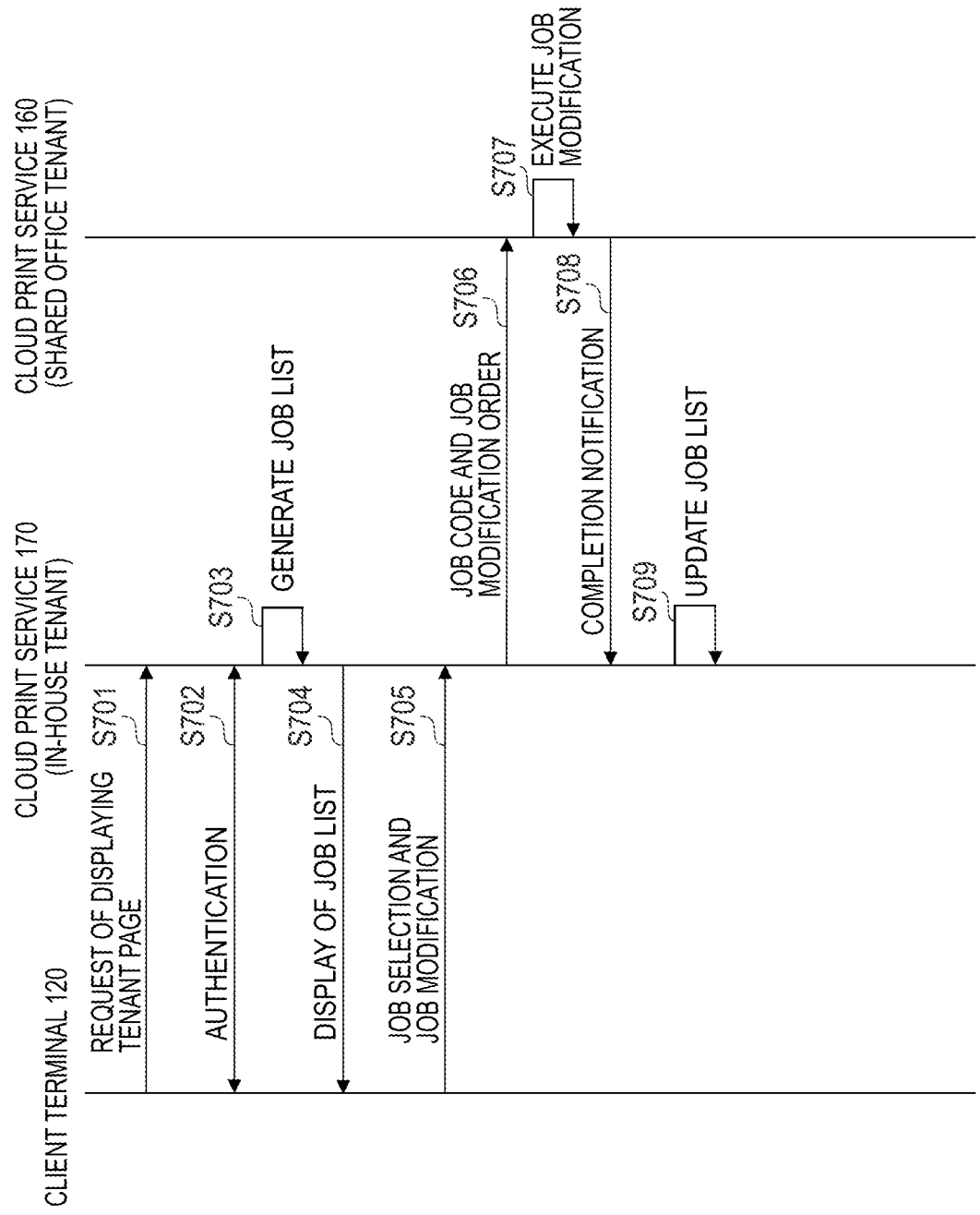
FIG. 7 shows a sequence diagram depicting an example of processes for modifying a print job.

The functional configuration that will be described later with reference to FIG. 3 and the processing that will be described later with reference to FIGS. 5, 7, and 9 are realized by a designated information processing apparatus 200 that develops programs stored in the ROM 203 or the auxiliary storage device 204 to the RAM 202 for executing the programs.

<Functional Configurations>

Figure 3:
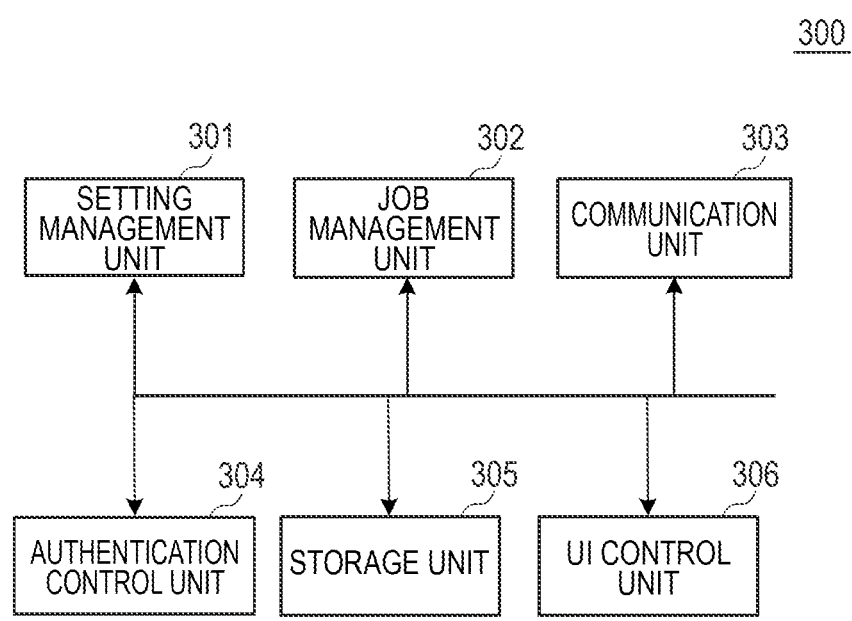
FIG. 3 shows an example of a block diagram depicting functional configurations of the information processing device according to the present disclosure.

With reference to FIG. 3, an example of the functional configurations of the information processing apparatus constituting the system according to the present embodiment will be described with particular attention to the configuration about the provision of the CPSs 160, 170, and 180. The CPSs 160, 170, and 180 may be provided by different information processing apparatuses, or a plurality of CPSs may be provided by one information processing apparatus. In the following description, for convenience, the description will be focused on the case where an information processing apparatus 300 executes various processes related to the provision of the CPS 160, but substantially the same will be applied to the case where the CPS 170 and the CPS 180 are provided.

The information processing apparatus 300 includes a setting management unit 301, a job management unit 302, a communication unit 303, an authentication control unit 304, a storage unit 305, and a UI control unit 306.

The setting management unit 301 stores setting information regarding various functions of the CPS 160 in a predetermined storage area (for example, RAM 203, auxiliary storage device 204, etc.), and reads the setting information from the storage area at a desired timing. The setting information includes, for example, tenant information and job information related to the submitted print job.

The job management unit 302 acquires information related to a job (for example, a print job, etc.) from another device (for example, from client terminals 100, 120, 140, etc.) and stores the information in a predetermined storage area (for example, in the storage unit 305 and the like). The job management unit 302 may acquire information related to the job (for example, a print job, etc.) from the CPS (for example, from the CPS 170 and 180, etc.) and store the information in a predetermined storage area.

The communication unit 303 transmits and receives various data to and from other devices. For example, the communication unit 303 may receive a print job, a job execution request, or the like from other devices. Examples of the other devices include the client terminals 100, 120, and 140 and the image forming apparatuses 110, 130, and 150. The communication unit 303 may receive various processing requests from other CPSs and transmit information corresponding to the processing results to the CPS.

The authentication control unit 304 executes various processes related to the management of the user. The authentication control unit 304 may store, in a predetermined storage area (for example, in the storage unit 305, which will be described later, and the like), information about the user that is added in response to an instruction from the manager of the tenant. As another example, the authentication control unit 304 may manage information about the user by cooperating with an external authentication service.

The storage unit 305 stores various data. For example, the storage unit 305 may store various data in response to a request from the job management unit 302 or the authentication control unit 304.

In response to a request from other devices, the UI control unit 306 executes processing relating to an output of a UI for accepting an input from a user and presenting various information to the user. Examples of such other devices include the client terminals 100, 120, and 140 and the image forming apparatuses 110, 130, and 150. As a specific example, in response to a request from a browser operating in the client terminal 100, the UI control unit 306 may generate a screen (that will be described later with reference to FIGS. 4 and 6), and transmit the screen to the client terminal 100 via the communication unit 303. Thus, the screen generated by the UI control unit 306 is presented to the user through a browser operating in the client terminal 101.

<Processing>

An example of the processing of the system according to the present embodiment will be described below with particular attention to the processing pertaining to the printing associated with the cooperation of the CPS, and the processing pertaining to the modification of the print job, respectively.

Figure 4:
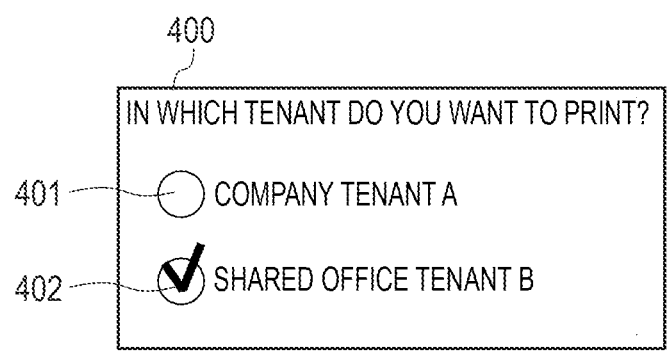
FIG. 4 shows an example of a screen for receiving an instruction for selecting a tenant.

First, with reference to FIGS. 4 and 5, the descriptions will be given of an example of a printing process associated with the cooperation of the CPS, particularly focusing on a case where a document stored in the client terminal 120 under control of the company A is printed using the image forming apparatus 110 installed in the shared office. FIG. 4 shows an example of a screen for receiving, from a user, an instruction related to the selection of a tenant to execute printing. FIG. 5 shows an example of a processing sequence related to printing associated with the cooperation of the CPS, particularly focusing on the processing of the client terminal 120, the CPS 170, the CPS 160, and the image forming apparatus 110.

In step S501, the client terminal 120 and the CPS 170 cooperate to execute a process related to the authentication of the user. Specifically, the client terminal 120 receives an input of information used for authentication such as a user name and a password from a user via a predetermined screen, and transmits the information to the CPS 170. The authentication control unit 304 of the CPS 170 executes processing related to authentication of a subject user based on the information transmitted from the client terminal 120. At this time, the authentication control unit 304 may request a predetermined authentication service to authenticate the user. When the authentication of the user fails in step S501, the client terminal 120 and the CPS 170 again execute the process (process related to the authentication of the user) in step S501.

If the user authentication is successful in step S501, the client terminal 120 advances the processing to step S502.

In step S502, the client terminal 120 presents a screen 400 shown in FIG. 4 to the user and receives, from the user, an instruction related to the selection of a tenant for executing printing through the screen 400. As a specific example, the client terminal 120 may acquire data related to the display of the screen 400 generated by the UI control unit 306 of the CPS 170 from the CPS 170, and present the screen 400 to the user via a browser or the like based on the data.

In the screen 400 shown in FIG. 4, the radio buttons 401 and 402 accept an instruction related to the designation of either an in-house tenant or a shared office tenant as a tenant executing printing. Specifically, the radio button 401 corresponds to an in-house tenant, and if the radio button 401 is designated, a print job is transmitted to the CPS 170, and the print job is transmitted from the CPS 170 to the image forming apparatus 130. The radio button 402 corresponds to a shared office tenant and if the radio button 402 is designated, a print job is transmitted to the CPS 160 via the CPS 170, and the print job is transmitted from the CPS 160 to the image forming apparatus 110.

In the example shown in FIG. 5, it is assumed that the radio button 402 has been selected to perform printing in the shared office tenant, and the following description will be given.

In step S503, the client terminal 120 transmits the print job and information corresponding to the result of the tenant selection made in step S502 to the CPS 170. The process in which the CPS 170 receives the print job transmitted from the client terminal 120 in step S503 corresponds to an example of the first job receiving process.

In step S504, the CPS 170 transmits the print job received from the client terminal 120 in step S503 to the CPS 160. In step S504, the CPS 170 also transmits, to the CPS 160, information indicating the CPS 170 to which the job code is to be transmitted in step S507 described later. The process in which the CPS 170 transmits the print job received from the client terminal 120 to the CPS 160 in step S504 corresponds to an example of the job transmitting process. The process in which the CPS 160 receives the print job transmitted from the CPS 170 in step S504 corresponds to an example of the second job receiving process.

In step S505, the CPS 160 issues identification information (hereinafter also referred to as "job code") for uniquely identifying the print job received from the CPS 170 in step S504.

In step S506, the CPS 160 associates the print job received from the client terminal 120 in step S503 with the job code issued in step S505, and stores the job information in a predetermined storage area (for example, in the storage unit 305). For example, Table 1 shows an example of job information stored in the storage area.

In the job information shown in Table 1, information for each job stored in the CPS 160 is stored as a list. The "job ID" is identification information for uniquely identifying information for each job held in the job information. The "job name" is a name indicating a target job. The "creation date" is information indicating the date when the job was created. The "print setting" is information indicating a setting related to printing applied to the target job. The "source tenant" is information indicating a tenant that has sent a target job to the CPS 160, which may be a URL, for example. The "job code" is information indicating a job code issued by the CPS 160 for a target job. The "job file path" is information indicating the storage destination of the job data transmitted to the CPS 160.

In the example shown in Table 1, it can be understood that the job name of the job received by the CPS 160 is "fileW.pdf" and the URL of the source tenant is "https://companyA".

In step S507, the CPS 160 transmits the job code issued in step S505 to the CPS 170. Thus, the job code issued by the CPS 160 can be transmitted to the user who has instructed printing without transmitting the user information managed by the CPS 170 to the CPS 160. The process of transmitting the job code issued by the CPS 160 to the CPS 170 in step S507 corresponds to an example of the job code transmitting process.

The process in which the CPS 170 receives the job code transmitted from the CPS 160 in step S507 corresponds to an example of the job code receiving process.

In step S508, the job management unit 302 of the CPS 170 stores the job code transmitted from the CPS 160 in a predetermined storage area (for example, in the storage unit 305) as job information. For example, Table 2 shows an example of job information stored in a predetermined storage area by the CPS 170.

TABLE 2

| JOB ID | JOB NAME | CREATION DATE | PRINT SETTING | DESTINATION TENANT | DESTINATION JOB CODE |
|---|---|---|---|---|---|
| XXX001 | fileX.pdf | 2020 Dec. 1 | AUTO/PORTRAIT/1 in 1, SINGLE-SIDED | | |
| XXX002 | fileY.pdf | 2020 Dec. 3 | AUTO/PORTRAIT/1 in 1, SINGLE-SIDED | | |
| XXX003 | fileZ.pdf | 2020 Dec. 3 | AUTO/PORTRAIT/1 in 1, SINGLE-SIDED | | |
| XXX004 | fileW.pdf | 2020 Dec. 3 | AUTO/PORTRAIT/1 in 1, SINGLE-SIDED | https://sharedOfficeB | XXX-XXXX-XXXX |

In the job information shown in Table 2, information for each job stored by the CPS 170 is stored as a list. The "job ID" is identification information for uniquely identifying information for each job held in the job information. The "job name" is a name indicating a target job. The "creation date" is information indicating the date when the job was created. The "print setting" is information indicating a setting related to printing applied to the target job. The "destination tenant" is information indicating a destination when a target job is transmitted from the CPS 170 to another CPS, which may be a URL, for example. The "destination job code" is information indicating a job code issued by the tenant of the destination for the target job.

TABLE 1

| JOB ID | JOB NAME | CREATION DATE | PRINT SETTING | SOURCE TENANT | JOB CODE | JOB FILE PATH |
|---|---|---|---|---|---|---|
| YYY001 | fileW.pdf | 2020 Dec. 3 | AUTO/PORTRAIT/1 in 1, SINGLE-SIDED | https://companyA | XXX-XXXX-XXXX | /tenantA/YYY001/fileW.pdf |

For example, a job managed in association with the job ID "XXX004" in Table 2 corresponds to a job managed in association with the job ID "YYY001" in Table 1. Therefore, the job is indicated as a job transmitted from a tenant corresponding to CPS 170 in Table 1, and is indicated as a job transmitted to CPS 160 in Table 2.

In step S509, the CPS 170 transmits the job code received from the CPS 160 in step S507 to the client terminal 120.

In step S510, the image forming apparatus 110 receives an input of a job code corresponding to a desired print job from a user. The job code input here includes, for example, the job code notified from the CPS 170 in step S509.

In step S511, the image forming apparatus 110 transmits the job code received in step S510 to the CPS 160, and requests the CPS 160 to transmit a print job.

In step S512, the job management unit 302 of the CPS 160 extracts, from a predetermined storage area (for example from the storage unit 305), job information corresponding to the job code received from the image forming apparatus 110 in step S511. The job management unit 302 of the CPS 160 transmits, to the image forming apparatus 110, a job (for example, a print job) corresponding to the extracted job information. For example, it is assumed that the job code received by the image forming apparatus 110 in step S510 is "XXX-XXXX-XXXX" and the job information held in the CPS 160 is an example shown in Table 1. In this case, the job information to which "YYY001" is assigned as the job ID corresponds to the specified job.

In step S513, the image forming apparatus 110 executes a process related to printing based on the job received from the CPS 160 in step S512.

Next, with reference to FIGS. 6 and 7, an example of a process related to the operation of a print job will be described with particular attention to a case where a job transmitted from the CPS 170 to the CPS 160 is operated from a tenant associated with the CPS 170 as a transmission source. This is a method for realizing the operation of a job from the CPS 170 in a state where the CPS 170 does not have the job after the job is transmitted from the CPS 170 to the CPS 160.

For example, when a job is sent from an in-house tenant to a shared office tenant, there is no job in the in-house tenant, and it may become difficult for the in-house tenant to perform various modifications (for example, changing print settings, etc.) on the job. When guest printing is performed by using an image forming apparatus associated with a shared office subject and if the user does not have an account of the shared office subject, it becomes difficult to perform the operation for the target job via a client terminal. Under such circumstances, for example, in order to perform various operations on the job, the user would have to directly operate the image forming apparatus associated with the shared office. Therefore, it is inconvenient for the user that it is difficult to perform various operations on the job before the user goes to the shared office. FIGS. 6 and 7 show examples for solving the above problem.

FIG. 6 shows an example of a screen related to the operation of a job that is presented to a user in a tenant (in-house tenant) with which the CPS 170 is associated. FIG. 7 shows an example of processing related to the operation of a print job, particularly focusing on the processing of the client terminal 120, the CPS 170, and the CPS 160.

In step S701, in response to an instruction from the user, the client terminal 120 requests the CPS 170 to confirm various pieces of information related to the tenant and to present a screen (hereinafter also referred to as "tenant page") for accepting various instructions. As a specific example, the client terminal 120 may request the CPS 170 to present the tenant page of the tenant by accessing the URL of the tenant designated by the user via a browser or the like.

In step S702, the client terminal 120 and the CPS 170 cooperate to execute a process related to the authentication of the user. Specifically, the UI control unit 306 of the CPS 170 causes the client terminal 120 to present a login screen related to the authentication of the user in response to the request from the client terminal 120 in step S701. The client terminal 120 receives an input of information used for authentication such as a user name and a password from the user through the login screen and transmits the information to the CPS 170. The authentication control unit 304 of the CPS 170 executes processing related to authentication of an object user on the basis of the information transmitted from the client terminal 120. At this time, the authentication control unit 304 may request a predetermined authentication service to authenticate the user.

In step S703, the UI control unit 306 of the CPS 170 generates a list of accepted jobs based on the job information stored in a predetermined storage area (for example, in the storage unit 305).

In step S704, the UI control unit 306 of the CPS 170 generates display information for displaying the list of jobs generated in step 703, and transmits the display information to the client terminal 120. Thus, the client terminal 120 can present a list of jobs accepted by the CPS 170 to the user based on the display information transmitted from the CPS 170.

The screen 600 shown in FIG. 6 shows an example of a screen for presenting a list of jobs.

The display area 601 is an area in which a list of jobs is displayed. A list of jobs accepted by the CPS 170 is displayed in the display area 601. At this time, the job to be displayed in the display area 601 may be limited to the job (that is, a job accepted based on an instruction from the logged-in user) associated with the account of the logged-in user. The display area 601 may display at least some of the job information as exemplified in Table 2 for each job. For example, in the screen 600 shown in FIG. 6, job name, creation date, and destination tenant information are displayed for each job among the job information shown in Table 2.

A button 603 is a user interface for receiving an instruction related to deletion of a job from a user. If a button 603 is pressed in a state that at least a part of a job among a list of jobs displayed in a display area 601 is selected, the job is set as a deletion target.

A button 602 is a user interface for receiving an instruction to change the print setting from a user. If the button 602 is depressed in a state that at least a part of the job among the list of jobs displayed in the display area 601 is selected, a screen for receiving designation of change contents of settings related to printing for the job from the user is displayed.

The screen 610 shown in FIG. 6 shows an example of a screen for receiving an instruction from a user about the contents of an operation (for example, changes to the settings) for the job designated in the screen 600.

A setting area 611 is a user interface for receiving the designation of the contents of the setting change related to printing from the user. For example, in the example shown in FIG. 6, the setting area 611 is provided with setting areas for accepting the designation of "paper size", "orientation (paper orientation)", "Nup", and "one side/both side" as settings related to printing. More specifically, in the example shown in FIG. 6, "automatic", "vertical", "1 in 1", and "one side" are designated as "paper size", "orientation", "Nup", and "one side/two side".

A button 612 is a user interface for receiving an instruction related to the application of the setting specified via the setting area 611 from the user. When the button 612 is depressed, the contents of setting related to printing specified in the setting area 611 are applied.

A button 613 is a user interface for receiving an instruction related to cancellation of a setting change related to printing from a user. If the button 613 is depressed, the execution of the processing relating to the change of the setting content is canceled regardless of the setting content relating to printing designated in the setting area 611, and the original setting is maintained.

In step S705, the client terminal 120 receives from the user via the screens 600 and 610 a designation of the job to be operated and a designation of the content of the operation for the job (for example, a designation related to deletion of a job or a designation related to changes in settings related to printing). Then, the client terminal 120 transmits information about the designated job and information showing the contents of the operation for the designated job to the CPS 170.

In step S706, the job management unit 302 of the CPS 170 determines whether the job designated by the user via the client terminal 120 in step S705 has been previously transmitted to the CPS 160. As a specific example, the job management unit 302 of the CPS 170 may determine whether a specified job has previously been transmitted to the CPS 160 by referring to the job information held in a predetermined storage area. If the designated job is the job previously transmitted to the CPS 160, the job management unit 302 of the CPS 170 transmits a job code corresponding to the job and information (hereinafter also referred to as "job operation instruction") showing operation contents to the job to the CPS 160. The process in step S706 is executed, for example, if the button 603 on the screen 600 is pressed or if the button 612 on the screen 610 is pressed.

In step S707, the job management unit 302 of the CPS 160 specifies a target job based on the job code transmitted from the CPS 170 in step S706. Then, the job management unit 302 of the CPS 160 executes processing (for example, changing settings related to printing or deleting jobs, etc.) corresponding to the job operation instruction received from the CPS 170 in S706 for the specified job.

In step S708, the CPS 160 notifies the CPS 170 that the processing related to the operation of the job executed in step S707 has been completed.

In step S709, the job management unit 302 of the CPS 170 updates the job information (in other words, a list of information for each job) held in the predetermined storage area based on the notification from the CPS 160 in step S708. As a specific example, the job management unit 302 of the CPS 170 may delete job information (for example, a job code issued by CPS 160) corresponding to a job if the job is deleted in step S707.

In the example shown in FIG. 7, the list of jobs is generated based on the job information stored in the predetermined storage area in step S703, and display information for displaying the list is transmitted to the client terminal 120 in step S704. On the other hand, it can be assumed that the job has already been deleted in the CPS 160, which is the destination of the job. Therefore, the CPS 170 may again acquire job information from the CPS 160 to which the job is to be transmitted and update the job information held in the predetermined storage area. Thus, the job information about the job held in the CPS 160 can be updated to the latest state according to the state of the job in the CPS 170 as the transmission destination of the job.

The job information stored in the predetermined storage area (for example, in the storage unit 305) in the CPS 170 may be browsable through the image forming apparatus 130 under the control of the CPS 170. In this case, for example, a list of jobs held in the CPS 160 may be presented by excluding the jobs transmitted to the CPS 170 from the list of jobs to be presented.

In the example shown in FIG. 7, the client terminal 120 accesses the URL of the tenant designated by the user through a browser or the like, thereby requesting the CPS 170 to present the tenant page of the tenant. On the other hand, it can be assumed that the user performs the operation from the client terminal 100 located in the shared office. As a specific example, it can be assumed that the client terminal 100 accesses the CPS 170 from the outside by using technologies such as a VPN (Virtual Private Network). Therefore, the processing of the client terminal 120 shown in FIG. 7 may be performed by the client terminal 100.

In the example shown in FIG. 5, an instruction related to the designation of a tenant for executing printing is received from a user through the screen 400 in step S502. On the other hand, it is conceivable that the user has not determined a tenant to execute printing at this time. Therefore, in step S502, the shared office is not specified, but the job may be selected on the screen 600 to change the tenant that executes printing later. This operation may be performed from the client terminal 120 or from the client terminal 100.

By applying the above processing, for example, the job sent from the in-house tenant to the shared office can be confirmed and various modifications on the job can be performed through the client terminal 120 associated with the in-house tenant. As described above, according to the system of the present embodiment, it is possible to link CPSs of a plurality of tenants (e.g., tenants and shared offices in the company) in a more suitable manner.

Modified Embodiment

A modification of the system according to this embodiment will be described below. In the above-described embodiment, the description is focused on the case where the CPS corresponding to the in-house tenant cooperates with the CPS corresponding to the shared office tenant. The modified example here shows that the communications among a plurality of tenants is mediated by another tenant, with particular attention to a case in which the CPS corresponding to each of the in-house tenant and the shared office tenant cooperates via the CPS corresponding to the public tenant.

(System Configurations)

Figure 8:
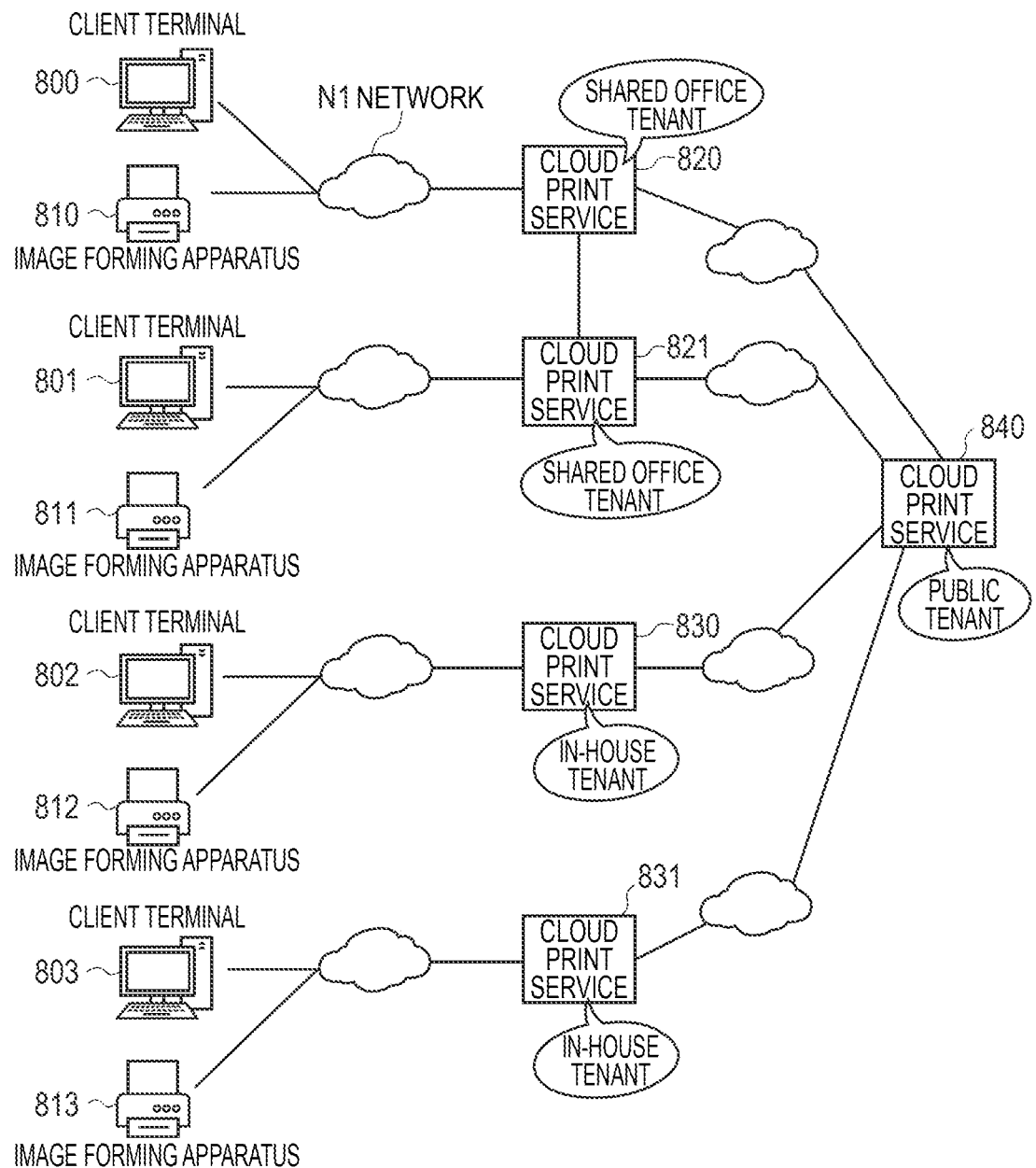
FIG. 8 shows another example of system configurations according to the present disclosure.

FIG. 8 is a diagram showing an example of the system configurations of the system according to the present modification. The system shown in FIG. 8 includes CPSs 820, 821, 830, 831, and 840. Each of the CPS 830 and 831 schematically illustrate a CPS associated with an in-house tenant. Each of the CPSs 820 and 821 schematically show a CPS associated with a shared office. The CPS 840 also schematically illustrates a CPS associated with a public tenant.

Client terminals 800, 801, 802, and 803 schematically represent respective client terminals under the management of tenants corresponding to the CPSs 820, 821, 830, and 831. Similarly, image forming apparatuses 810, 811, 812, and 813 schematically represent respective image forming apparatuses under management of a tenant corresponding to the CPSs 820, 821, 830, and 831.

The CPS 830 may receive a print job from the client terminal 802 and transmit the print job to the image forming apparatus 812. In this case, when receiving a print job from the CPS 830, the image forming apparatus 812 executes printing based on the print job. Similarly, the above processing is also executed in the configuration among the CPS 831, the client terminal 803, and the image forming apparatus 813.

The CPS 820 may also receive a print job from the client terminal 800 and transmit the print job to the image forming apparatus 810. In this case, when receiving a print job from the CPS 820, the image forming apparatus 810 executes printing based on the print job. Similarly, the above processing is also executed in the configuration among the CPS 821, the client terminal 801, and the image forming apparatus 811.

The CPS 840 may be interposed between at least one of the CPSs 820 and 821 and at least one of the CPSs 830 and 831 in transmitting and receiving a print job and the execution result of the print job.

As a specific example, the CPS 830 may receive a print job from the client terminal 802 and transmit the print job to the CPS 840. Similarly, the above processing is also executed in the configuration among the CPS 831, the client terminal 803, and the CPS 840.

The CPS 820 may receive a print job held in the CPS 840 from the CPS 840 and transmit the print job to the image forming apparatus 810. As a result, the image forming apparatus 810 executes processing related to printing based on the print job. Similarly, the above processing is also executed in the configuration among the CPS 821, the CPS 840, and the image forming apparatus 811.

Each of the components described above are connected to each other so as to be able to communicate with each other via a predetermined network N1. It should be noted that the type of the network N1 is not particularly limited as long as data can be transmitted and received between the above-described components. As a specific example, any one of the Internet, LAN, WAN, telephone line, leased digital line, ATM, etc., or a combination thereof may be applied as the network N1.

(Processing)

With reference to FIG. 9, an example of the processing of the system according to the present modification will be described with particular attention to the processing relating to printing associated with the cooperation of the CPS.

In the example shown in FIG. 9, the processing in steps S901 through S909 corresponds to the steps of transmitting a job to the CPS 830, and then notifying a job code used when causing the image forming apparatus 810 under control of the CPS 820 to execute printing. The processing in steps S901 through S909 is substantially similar to the processing in steps S501 through S509 in the example shown in FIG. 5. In the example shown in FIG. 5, a job is transmitted to the CPS 160 associated with the shared office and the CPS 160 issues a job code. On the other hand, in the example shown in FIG. 9, a job is transmitted to the CPS 840 associated with the public tenant, and the CPS 840 issues a job code.

In step S910, the image forming apparatus 810 under the control of the shared office receives input of a job code corresponding to a desired print job from a user. The job code input here includes, for example, the job code notified from the CPS 840 in step S909.

In step S911, the image forming apparatus 810 transmits the job code received in step S910 to the CPS 820, and requests the CPS 820 to transmit a print job.

In step S912, the CPS 820 transfers the job code received from the image forming apparatus 810 in step S911 to the CPS 840, and requests the CPS 840 to transmit a print job.

In step S913, the job management unit 302 of the CPS 840 extracts job information corresponding to the job code received from the CPS 820 in step S912 from a predetermined storage area (for example, from the storage unit 305). The job management unit 302 of the CPS 840 transmits a job (for example, a print job) corresponding to the extracted job information to the CPS 820.

In step S914, the CPS 820 transfers the job received from the CPS 840 in step S913 to the image forming apparatus 810.

In step S915, the image forming apparatus 810 executes a process related to printing based on the job received from the CPS 820 in step S914.

The system according to the present modified embodiment can modify a job transmitted and received between the CPSs from a client terminal associated with a tenant that is a transmission source of the job, similarly to the system according to the previously described embodiment. The processing in the present embodiment is substantially similar to the example shown in FIG. 7. Specifically, in the example shown in FIG. 7, the processing sequence between the client terminal 120, the CPS 170, and the CPS 160 is applied between the client terminal 502, the CPS 830, and the CPS 840 in this modification.

In the example shown in FIG. 7, the client terminal 802 accesses the URL of the tenant designated by the user through a browser or the like, thereby requesting the CPS 830 to present the tenant page of the tenant. On the other hand, it can be assumed that the user performs the operation from the client terminal 800 located in the shared office. Therefore, in this modified example, the example shown in FIG. 7 may be executed from the client terminal 800 similarly to the previously-described embodiment.

In the example shown in FIG. 9, an instruction related to the designation of a tenant for executing printing is received from a user through the screen 400 in step S902. On the other hand, it is conceivable that the user has not determined a tenant to execute printing at this time. Therefore, in step S902, the shared office is not specified, but the job may be selected on the screen 600 to change the tenant that executes printing later. This operation may be performed from the client terminal 802 or from the client terminal 800.

As described above, even in a situation where the other tenant mediates the communications between the tenants, it is possible to confirm the job transmitted to the shared office through the client terminal associated with the in-house tenant and to perform various operations on the job.

According to the present invention, cloud print services related to a plurality of tenants can be linked in a more suitable manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-049538, filed Mar. 24, 2021 and Japanese Patent Application No. 2021-171119, filed Oct. 19, 2021, which are hereby incorporated by reference herein in their entirety.

What is claimed is:

1. A system comprising:
a first cloud print service connected to a client terminal via a first network; and
a second cloud print service connected to an image forming apparatus via a second network,
wherein the first cloud print service comprises one or more first memories, storing first instructions, and one or more first processors that execute the first instructions to:
receive a job from the client terminal;
transmit the received job to the second cloud print service;
receive a job code, which is associated with the transmitted job, issued by the second cloud print service;
store the received job code;
notify the client terminal of the received job code; and
transmit, to the second cloud print service, in response to receiving an instruction to modify the job stored in the second cloud print service from the client terminal after the job is transmitted to the second cloud print service, the job code associated with the job and information indicating the instruction to modify the job, and
wherein the second cloud print service comprises one or more second memories storing second instructions, and one or more second processors that execute the second instructions to:
receive the job transmitted from the first cloud print service;
issue the job code for the received job; store the received job and the issued job code in association with each other;
transmit the issued job code to the first cloud print service; and
modify the job according to the instruction to modify the job stored associated with the job code, in a state where the second cloud print service receives the job code and the information indicating the instruction to modify the job.

2. The system according to claim 1, wherein the instruction to modify includes deletion of the job.

3. The system according to claim 2, wherein the job code stored in the first cloud print service is deleted in a state where the first cloud print service receives a notice of deletion of the job associated with the job code from the second cloud print service.

4. A system comprising a first cloud print service connected to a client terminal via a network, the first cloud print service comprising:
one or more memories storing instructions; and
one or more processors that the instructions to:
receive, a job from the client terminal;
transmit the received job to a second cloud print service connected to an image forming apparatus;
receive a job code, which is associated with the transmitted job, issued by the second cloud print service;
store the received job code;
notify the client terminal of the received job code; and
transmit, to the second cloud print service, in response to receiving an instruction to modify the job stored in the second cloud print service from the client terminal after the job is transmitted to the second cloud print service, the job code associated with the job and information indicating the instruction to modify the job.

5. A method of controlling a system comprising a first cloud print service connected to a client terminal via a first network and a second cloud print service connected to an image forming apparatus via a second network, the method comprising:
the first cloud print service receiving a job from the client terminal;
the first cloud print service transmitting the received job to the second cloud print service;
the second cloud print service receiving the job transmitted from the first cloud print service;
the second cloud print service issuing a job code for the received job;
the second cloud print service storing the received job and the issued job code in association with each other;
the second cloud print service transmitting the issued job code to the first cloud print service;
the first cloud print service receiving the job code, which is associated with the transmitted job, issued by the second cloud print service;
the first cloud print service storing the received job code;
the first cloud print service notifying the client terminal of the received job code;
the first cloud print service transmitting, to the second cloud print service, in response to receiving an instruction to modify the job stored in the second cloud print service from the client terminal after the job is transmitted to the second cloud print service, the job code associated with the job and information indicating the instruction to modify the job; and
the second cloud print service modifying the job according to the instruction to modify the job stored associated with the job code, in a state where the second cloud print service receives the job code and the information indicating the instruction to modify the job.

6. A method of controlling a system comprising a first cloud print service connected to a client terminal via a network, the method comprising the first cloud print service:
   receiving a job from the client terminal;
   transmitting the received job to a second cloud print service connected to an image forming apparatus;
   receiving a job code, which is associated with the transmitted job, issued by the second cloud print service;
   storing the received job code;
   notifying the client terminal of the received job code; and
   transmitting, to the second cloud print service, in response to receiving an instruction to modify the job stored in the second cloud print service from the client terminal after the job is transmitted to the second cloud print service, the job code associated with the job and information indicating the instruction to modify the job.

* * * * *